US012753914B2

(12) United States Patent
Zhou et al.

(10) Patent No.: US 12,753,914 B2
(45) Date of Patent: Oct. 6, 2026

(54) QUICK INSTALLATION CONNECTOR AND LAMP ASSEMBLY

(71) Applicant: SAVANT TECHNOLOGIES LLC, East Cleveland, OH (US)

(72) Inventors: Huisheng Zhou, Shanghai (CN); Xiao Miao, Shanghai (CN); Huang Hai, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 19/187,425

(22) Filed: Apr. 23, 2025

(65) Prior Publication Data

US 2026/0071744 A1 Mar. 12, 2026

(30) Foreign Application Priority Data

May 13, 2024 (CN) ......................... 202421034532.2

(51) Int. Cl.
*F21V 23/06* (2006.01)
*H01R 4/48* (2006.01)

(52) U.S. Cl.
CPC ........... *F21V 23/06* (2013.01); *H01R 4/4863* (2013.01); *H01R 2201/00* (2013.01)

(58) Field of Classification Search
CPC .............................. F21V 23/06; H01R 4/4863
See application file for complete search history.

(56) References Cited

U.S. PATENT DOCUMENTS

| | | | | |
|---|---|---|---|---|
| 2014/0355261 | A1* | 12/2014 | Dingemans | F21V 25/04 362/217.17 |
| 2020/0084861 | A1* | 3/2020 | Park | H01F 27/2823 |
| 2021/0293401 | A1* | 9/2021 | Volkov | F21V 33/0012 |
| 2023/0220979 | A1* | 7/2023 | Hsu | F21V 23/06 439/425 |
| 2023/0349542 | A1* | 11/2023 | Hierzer | F21V 21/35 |
| 2024/0322461 | A1* | 9/2024 | Kaehny | H01R 4/30 |

FOREIGN PATENT DOCUMENTS

| | | |
|---|---|---|
| CN | 207778143 U | 8/2018 |
| CN | 209294884 U | 8/2023 |
| CN | 220169297 U | 12/2023 |
| KR | 200466811 Y1 | 5/2013 |
| KR | 200491001 Y1 | 2/2020 |

* cited by examiner

*Primary Examiner* — Christopher E Dunay
(74) *Attorney, Agent, or Firm* — Wood IP LLC

(57) ABSTRACT

Provided is a lamp assembly and an installation connector that includes a housing having an interior space and a through hole, a mounting bracket that includes a plate-like component, a part of the plate-like component extending into the interior space through the through hole, and the other part of the plate-like component being located outside the housing, a fixed component fixed in the interior space, and a spring, a first end of the spring being fixed to the fixed component, a second end of the spring being fixed on the part, and an extension and compression direction of the spring being parallel to the plate-like component, the plate-like component having a through channel penetrating it in a direction perpendicular thereto, and the mounting bracket performing translational movement between a rest position, an alignment position and an assembly position through the through hole along the extension and compression direction.

13 Claims, 9 Drawing Sheets

QUICK INSTALLATION CONNECTOR AND LAMP ASSEMBLY

This application claims priority to Chinese Patent Application Serial Number 202421034532.2, filed May 13, 2024, which is herein incorporated by reference.

TECHNICAL FIELD

The present disclosure relates to a quick installation connector, in particular, a quick installation connector for a lamp, for example an elongated lamp tube, and a lamp assembly.

BACKGROUND

In the prior art, for example, the mounting of elongated lamp tubes typically cannot be performed independently by a single person and requires two persons to operate the two ends of the elongated lamp tube, respectively. Furthermore, common mounting members generally require special tools for mounting and demounting, and have a high requirement on the positional accuracy of a mating member on which the mounting parts are intended to be mounted and which is provided on a surface to be mounted.

SUMMARY

In order to overcome the defects in the prior art, the present disclosure provides a quick installation connector. The quick installation connector comprises: a housing, the housing having an interior space, and a through hole being provided on the housing; a mounting bracket comprising a plate-like component, a part of the plate-like component extending into the interior space through the through hole, and the other part of the plate-like component being located outside the housing; at least one fixed component fixed in the interior space; and at least one spring, a first end of the spring being fixed to a corresponding fixed component, a second end of the spring opposite to the first end being fixed to the part of the plate-like component located in the interior space, and an extension and compression direction of the spring being parallel to the plate-like component, wherein the plate-like component is provided with a through channel penetrating the plate-like component in a direction perpendicular thereto, the through channel has a first segment extending parallel to the extension and compression direction of the spring and a second segment intersecting the first segment, the first segment has a first end for abutting against a fixed screw fixed on a surface to be mounted and a second end opposite to the first end of the first segment, the second segment has a first end for communicating with the second end of the first segment and a second end for penetrating through an edge of the plate-like component to communicate with the outside, wherein the mounting bracket is configured to be able to perform translational movement between a rest position, an alignment position and an assembly position through the through hole along the extension and compression direction of the spring and, wherein in the rest position, the spring is in a natural state; in the alignment position, the second segment is aligned with the fixed screw such that the fixed screw can enter the first segment via the second segment; and in the assembly position, the fixed screw abuts against the first end of the first segment. Accordingly, quick and convenient mounting and demounting of a device, such as a lamp, connected to a quick installation connector can be achieved, without using a specific dedicated tool. Furthermore, the use of a spring provides a soft contact between the mounting bracket and the fixed component, thereby better achieving shock absorption. In addition, such a design is less demanding on the positional accuracy of the fixed screw, which is pre-provided on the surface to be mounted, to which the quick installation connector is intended to be mounted.

Further, the first end of the first segment is positioned further from the spring than the second end of the first segment, wherein in the alignment position and in the assembly position, the spring is in an extended state, wherein the length of the spring in the alignment position is greater than the length of the spring in the assembly position. Accordingly, a pull-type mounting bracket is provided to facilitate the operation of a user.

Further, in the rest position, the through channel is located inside the housing. Accordingly, in the rest position, the through channel is concealed inside the housing, whereby a good appearance can be provided.

Further, the first end of the first segment is located closer to the spring than the second end of the first segment, wherein in the rest position, the through channel is located outside the housing, and in the alignment position and the assembly position, the spring is in a compressed state, wherein the length of the spring in the alignment position is less than the length of the spring in the assembly position. Accordingly, a push-type mounting bracket is provided to facilitate the operation of a user.

Further, the quick installation connector further comprises a limiting member fixed on the housing and extending into the interior space, the plate-like component is further provided with an elongated guide channel penetrating the plate-like component in a direction perpendicular thereto, an extending direction of the elongated guide channel is parallel to the extension and compression direction of the spring and has a first end and a second end opposite to each other, the first end of the elongated guide channel is located closer to the spring than the second end of the elongated guide channel, the limiting member extends perpendicular to the plate-like component into the elongated guide channel for limiting the translational movement of the mounting bracket. Accordingly, it can prevent the accidental detachment of the mounting bracket and also prevent the overstretching of the spring.

Further, the elongated guide channel and the through channel are provided independently from each other. Accordingly, this can improve the design adaptability and diversity.

Further, the quick installation connector further comprises a limiting member fixed on the housing and extending into the interior space, the plate-like component is further provided with an elongated guide channel penetrating the plate-like component in a direction perpendicular thereto, an extending direction of the elongated guide channel is parallel to the extension and compression direction of the spring and has a first end and a second end opposite to each other, the first end of the elongated guide channel is located closer to the spring than the second end of the elongated guide channel, the limiting member extends perpendicular to the plate-like component into the elongated guide channel for limiting the translational movement of the mounting bracket, and the second end of the elongated guide channel, the second end of the first segment, and the first end of the second segment are in communication with each other. Accordingly, the machining can be facilitated.

Further, the mounting bracket further comprises a plate-like handle, and the plate-like handle is perpendicularly connected to the plate-like component at the other part of the plate-like component located outside the housing. Accordingly, it is possible to facilitate the user operating the mounting bracket.

Further, the fixed component comprises a base fixedly provided in the interior space and a connection screw screwed to the base and having a head and a bolt, wherein a first end of the spring is hooked to the bolt and located between the base and the head. Accordingly, the mounting and demounting of the spring can be facilitated.

Further, the fixed component comprises protruding portions protruding from a side wall of the housing towards the interior space, and the first end of the spring is sheathed outside the protruding portion and abuts against the side wall of the housing. Accordingly, the mounting and demounting of the spring can also be facilitated.

Further, the quick installation connector comprises a plurality of fixed components and a plurality of springs that are equal to each other in quantity, the plurality of springs being arranged parallel to each other. Accordingly, the connection stability can be improved.

Further, the through hole has a shape fitting the cross-section shape of the plate-like component. Accordingly, the guidance of the mounting bracket can be facilitated.

The present disclosure further provides a lamp assembly. The lamp assembly comprises an elongated lamp tube and one or two quick installation connectors, wherein the quick installation connectors are fixed to the end portion of the elongated lamp tube. Accordingly, the mounting of the elongated lamp tube can be performed independently by one person, thereby reducing labor costs.

BRIEF DESCRIPTION OF THE DRAWINGS

The drawings are used for providing further understanding of the present disclosure and constitute a part of the present disclosure, and the exemplary embodiments of the present disclosure and illustrations thereof are used for explaining the present disclosure, rather than constitute inappropriate limitation on the present disclosure. In the drawings.

DETAILED DESCRIPTION OF THE EMBODIMENTS

Figure 1:
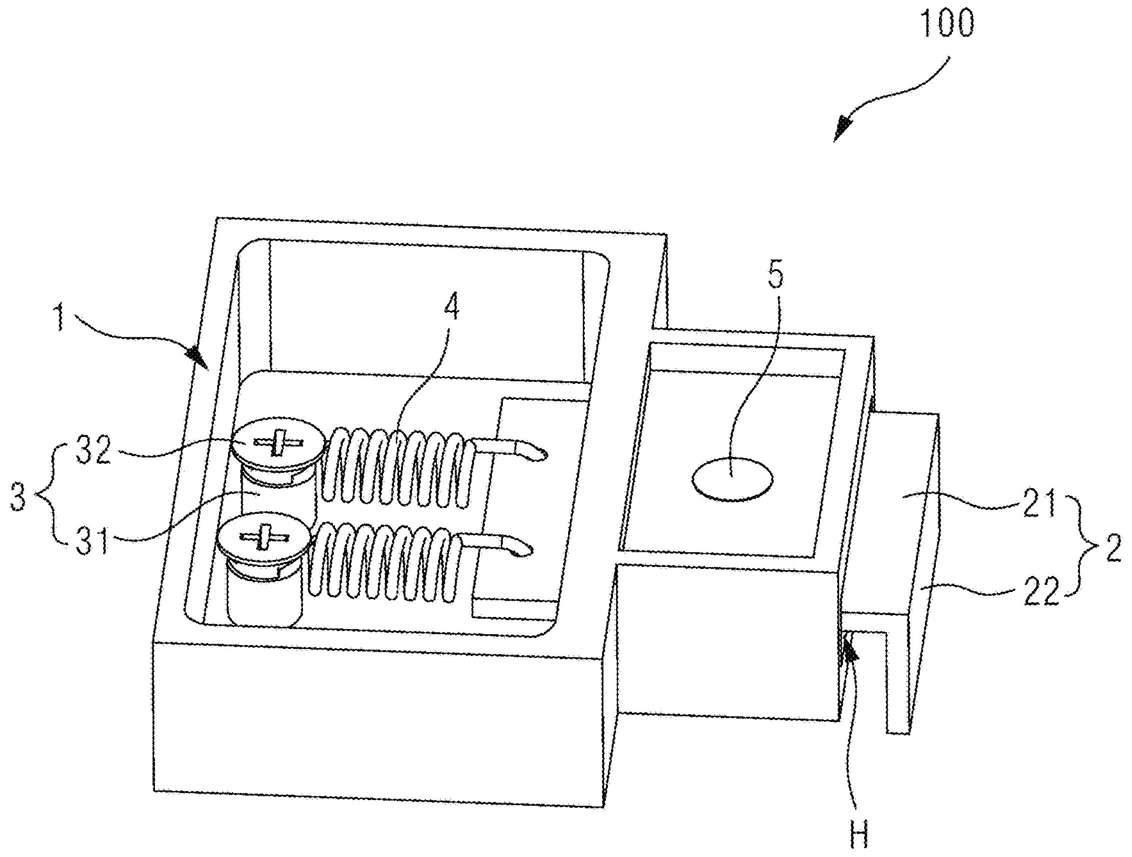
FIG. 1 is a schematic perspective view showing a quick installation connector according to a first embodiment of the present disclosure, wherein a mounting bracket is in a rest position.
Figure 2:
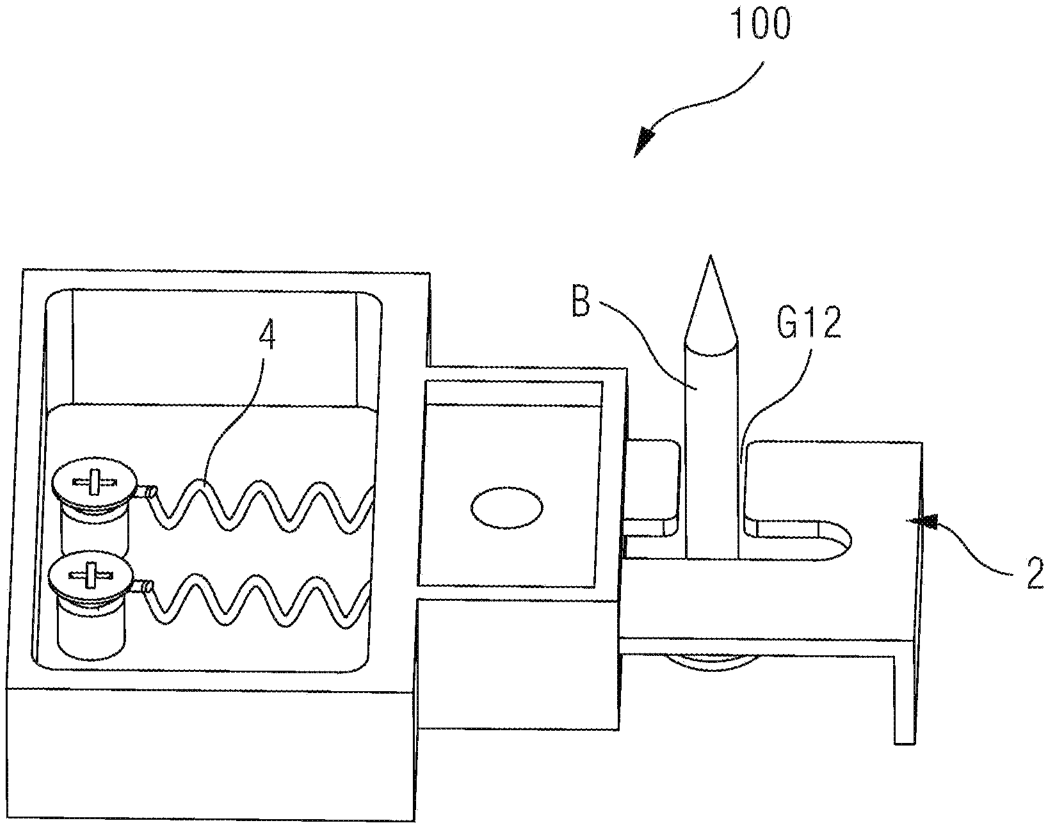
FIG. 2 is a schematic perspective view showing a quick installation connector according to a first embodiment of the present disclosure, wherein a mounting bracket in an alignment position.
Figure 3:
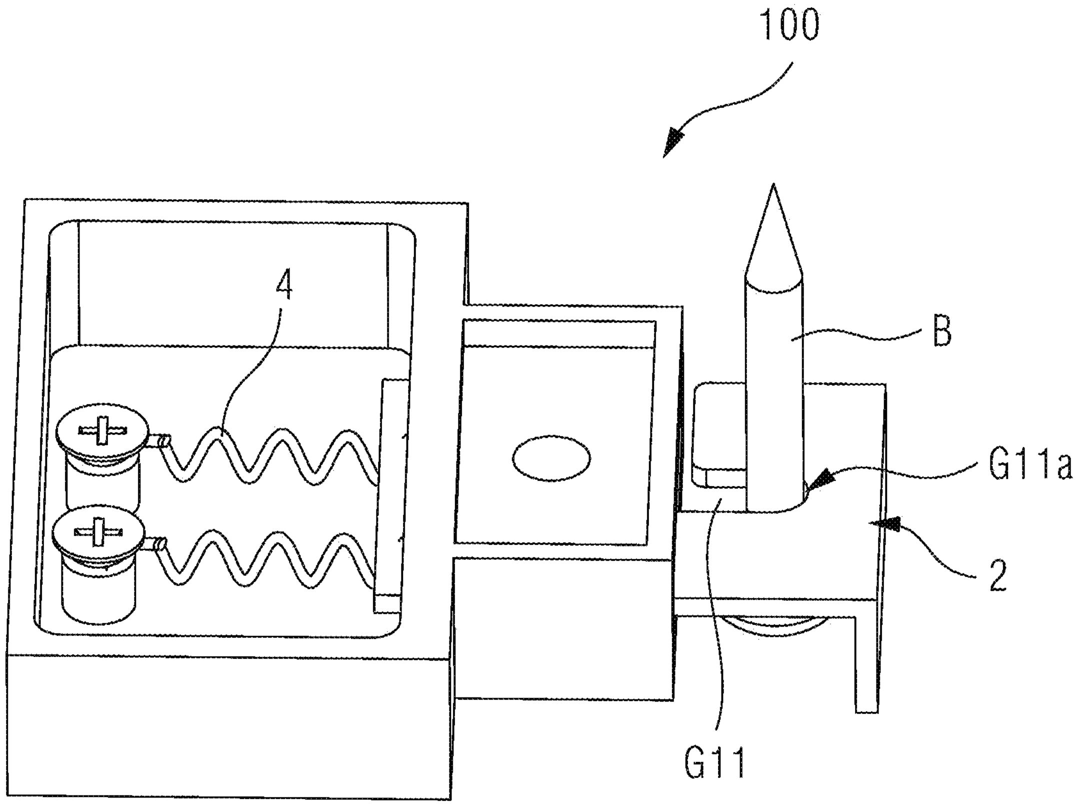
FIG. 3 is a schematic perspective view showing a quick installation connector according to a first embodiment of the present disclosure, wherein a mounting bracket is in an assembly position.

Hereinafter, the technical solutions in the embodiments of the present disclosure will be described in detail with reference to the accompanying drawings in the embodiments of the present disclosure. It should be noted that the embodiments in the present disclosure and features in the embodiments can be combined without conflicts.

The following detailed description should be understood with reference to the drawings which are an integral part of the description and which, by way of an example, illustrate the possibilities offered by the present disclosure. In the drawings, directional information, such as "top", "bottom", "inside", "outside", "upper", "lower", "front" and "rear" should be understood with reference to the drawings described. Components of the embodiments of the present disclosure can be configured in a plurality of different directions, which is to say that the directional terms are used only for the purpose of illustration and do not imply any limitations. It should be understood that other embodiments may be used, and structural or logical changes may be made without departing from the scope of the present disclosure. Therefore, the following detailed description is not to be understood to imply a limitation, and the present disclosure is defined by the attached claims.

Referring to the drawings, the present disclosure provides a quick installation connector. FIGS. 1 to 4 show a quick installation connector 100 and related components according to a first embodiment of the present disclosure, and FIGS. 5 to 8 show a quick installation connector 100 according to a second embodiment of the present disclosure.

Generally speaking, the quick installation connector of the present disclosure may comprise a housing 1, a mounting bracket 2, at least one fixed component 3 and at least one spring 4.

The housing 1 has an interior space, and a through hole H is provided on the housing 1. The mounting bracket 2 comprises a plate-like component 21, a part of the plate-like component 21 extends into the interior space of the housing 1 through the through hole H, and the other part of the plate-like component 21 is located outside the housing 1. The user can grasp the other part of the plate-like component 21 located outside the housing 1, so as to pull or push the mounting bracket 2. The fixed member 3 is fixed in the interior space of the housing 1. A first end of the spring 4 is fixed to a corresponding fixed component 3, a second end of the spring 4 opposite to the first end is fixed to the part of the plate-like component 21 located in the interior space, and the extension and compression direction of the spring 4 is parallel to the plate-like component 21.

The plate-like component 21 can be provided with a through channel G1 penetrating the plate-like component 21 in a direction perpendicular thereto. The through channel G1 has a first segment G11 extending parallel to the extension and compression direction of the spring 4 and a second segment G12 intersecting the first segment G11. That is, the first segment G11 and the second segment G12 may be connected to each other at an angle between 0 and 180 degrees. In particular, the second segment G12 may extend perpendicular to the first segment G11, i.e., the angle is 90 degrees. The first segment G11 has a first end G11*a* for abutting against a fixed screw B fixed on a surface to be mounted and a second end G11*b* opposite to the first end G11*a* of the first segment G11. The second segment G12 has a first end G12*a* for communicating with the second end G11*b* of the first segment G11 and a second end G12*b* for penetrating through an edge of the plate-like component 21 to communicate with the outside.

Figure 5:
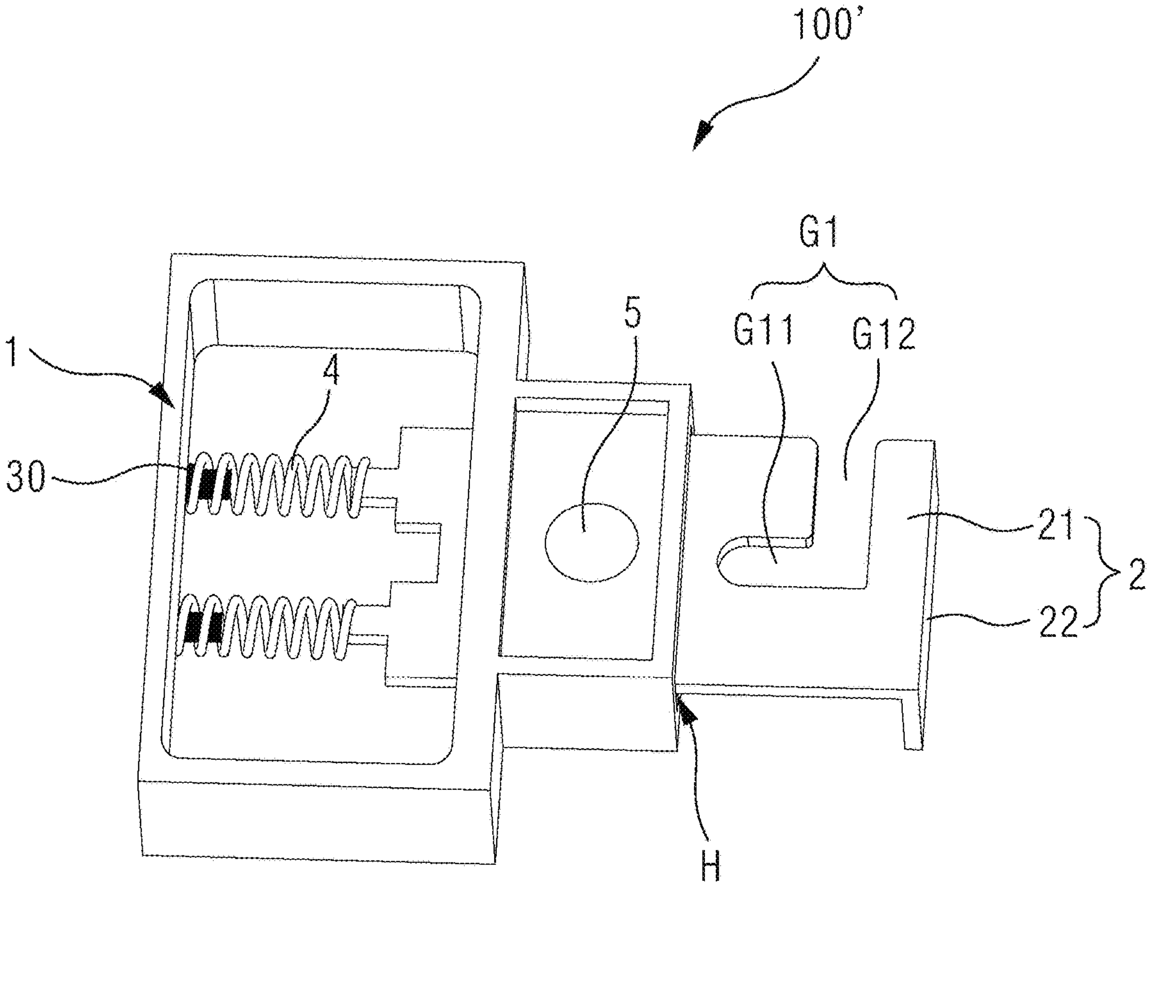
FIG. 5 is a schematic perspective view showing a quick installation connector according to a second embodiment of the present disclosure, wherein a mounting bracket is in a rest position.
Figure 6:
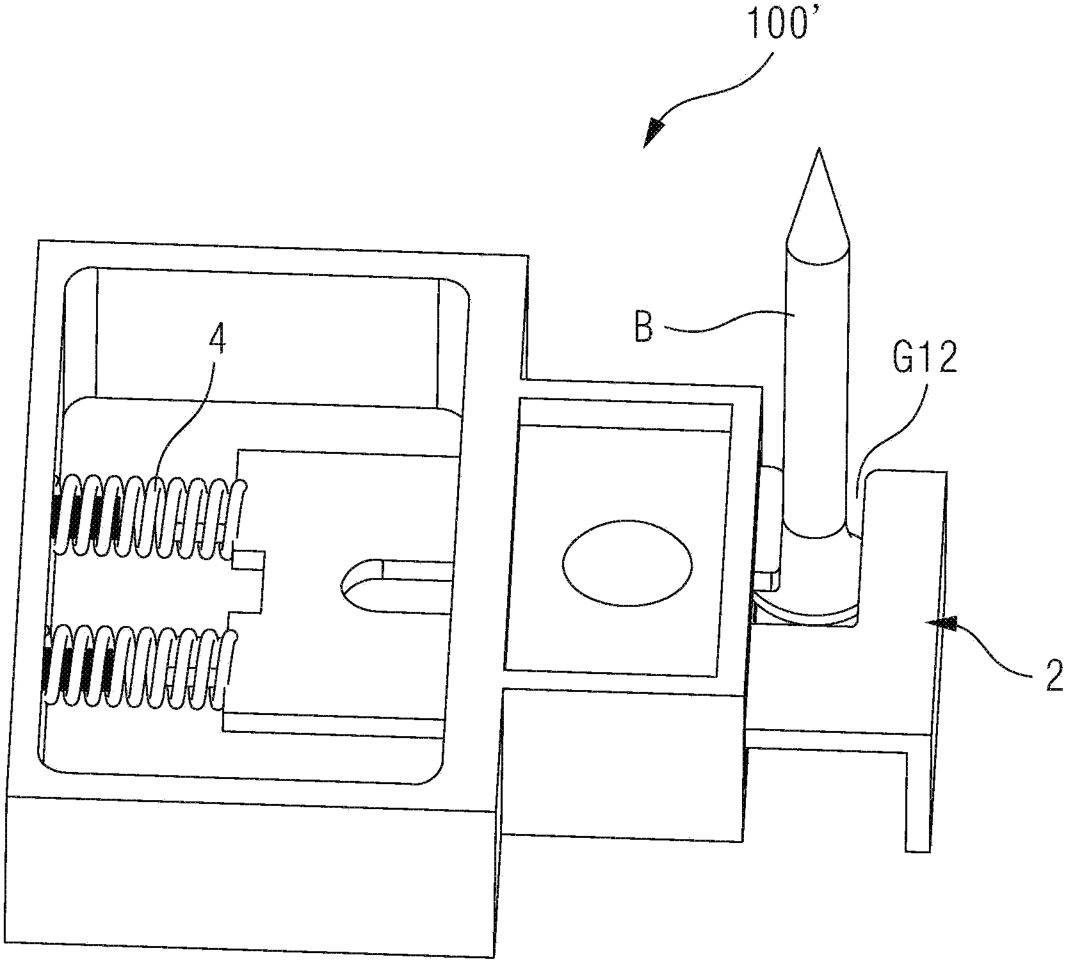
FIG. 6 is a schematic perspective view showing a quick installation connector according to a second embodiment of the present disclosure, wherein the mounting bracket is in an alignment position.
Figure 7:
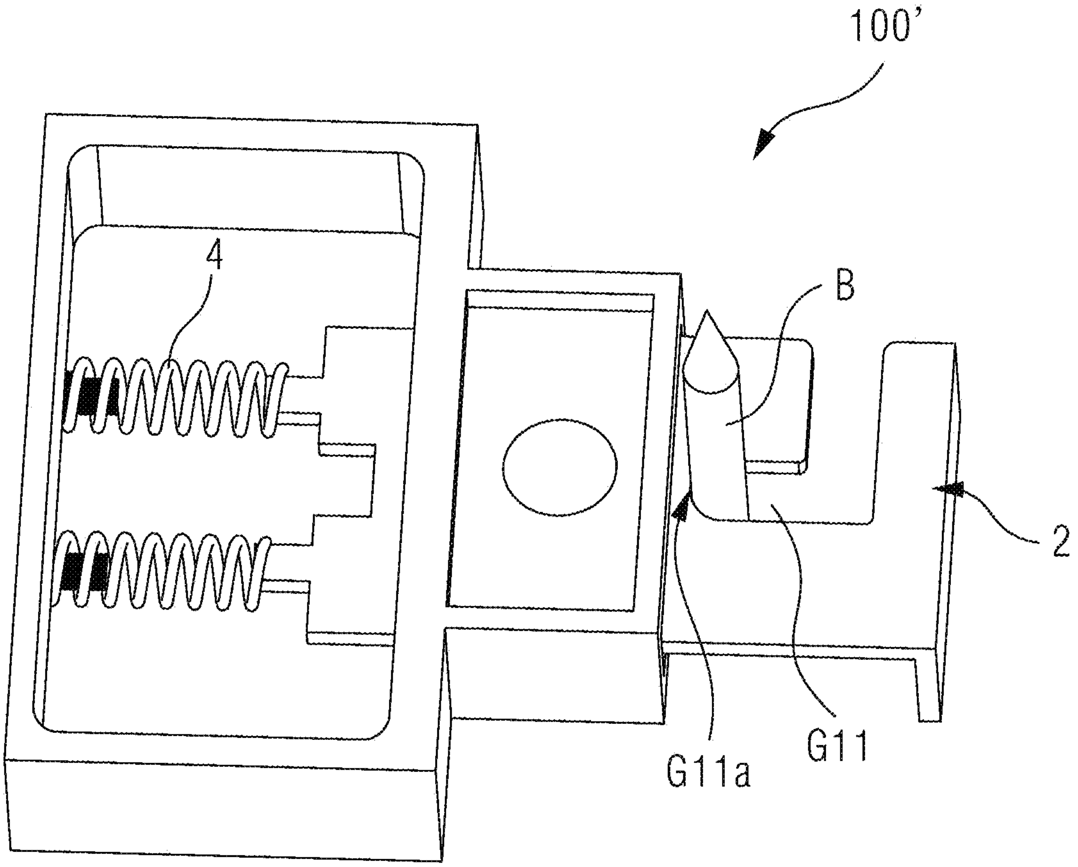
FIG. 7 is a schematic perspective view showing a quick installation connector according to a second embodiment of the present disclosure, wherein a mounting bracket is in an assembly position.

The mounting bracket 2 can be configured to perform translational movement between a rest position, an alignment position and an assembly position through the through hole H along the extension and compression direction of the spring 4. In the rest position as shown in FIG. 1 or FIG. 5, the spring 4 is in a natural state. In the alignment position shown in FIG. 2 or FIG. 6, the second segment G12 is aligned with the fixed screw B, such that the fixed screw B can enter the first segment G11 via the second segment G12. In the assembly position shown in FIG. 3 or FIG. 7, the fixed screw B abuts against the first end G11*a* of the first segment G11.

In the first embodiment of the present disclosure shown in FIGS. 1 to 4, the first end G11*a* of the first segment G11 is located further away from the spring 4 than the second end G11*b* of the first segment G11. In both the alignment position shown in FIG. 2 and the assembly position shown in FIG. 3, the spring 4 is in an extended state, wherein the length of the spring 4 in the alignment position is greater than the length of the spring 4 in the assembly position. Moreover, the length of the spring 4 in the assembly position is greater than the length of the spring 4 in the rest position. Accordingly, the quick installation connector 100 of the present embodiment is operated by using a pull-type mounting bracket.

As best shown in FIG. 1, in the rest position, the through channel G1 is located inside the housing 1. In other words, the through channel G1 is concealed inside the housing 1.

In the second embodiment of the present disclosure shown in FIGS. 5 to 8, the first end G11*a* of the first segment G11 is located closer to the spring 4 than the second end G11*b* of the first segment G11. In the rest position shown in FIG. 5, the through channel G1 is located outside the housing 1, and in the alignment position shown in FIG. 6 and the assembly position shown in FIG. 7, the spring 4 is in a compressed state, wherein the length of the spring 4 in the alignment position is less than the length of the spring 4 in the assembly position. Moreover, the length of the spring 4 in the assembly position is less than the length of the spring 4 in the rest position. Accordingly, the quick installation connector 100 of the present embodiment is operated by using a push-type mounting bracket.

In the first or second embodiment of the present disclosure, the quick installation connector can further comprise a limiting member 5 fixed on the housing 1 and extending into the interior space. For example, the limiting member 5 may be a rivet. Moreover, the plate-like component 21 may also be provided with an elongated guide channel G2 penetrating the plate-like component 21 in a direction perpendicular thereto for fitting with the limiting member 5. The extending direction of the elongated guide channel G2 is parallel to the extension and compression direction of the spring 4 and has a first end G2*a* and a second end G2*b* opposite to each other, the first end G2*a* of the elongated guide channel G2 is located closer to the spring 4 than the second end G2*b* of the elongated guide channel G2. The limiting member 5 extends perpendicular to the plate-like component 21 into the elongated guide channel G2 for limiting the translational movement of the mounting bracket 2.

Figure 8:
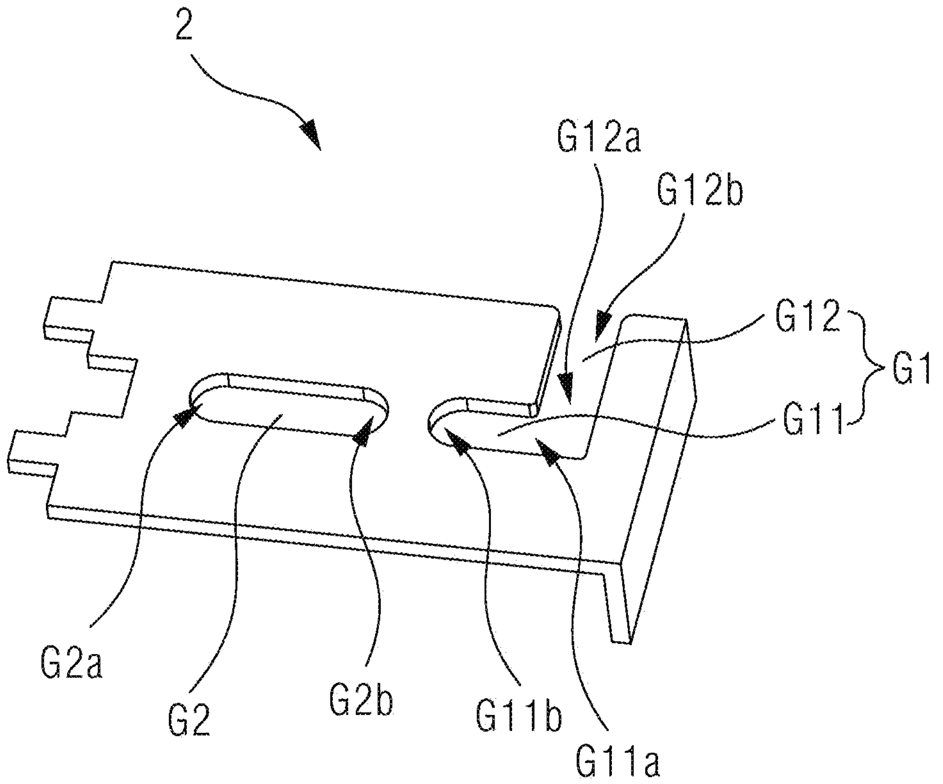
FIG. 8 is a schematic perspective view showing a mounting bracket of a quick installation connector according to a second embodiment of the present disclosure.

In the second embodiment of the present disclosure, as best shown in FIG. 8, the elongated guide channel G2 and the through channel G1 can be provided independently from each other, in other words, the two do not communicate with each other.

Figure 4:
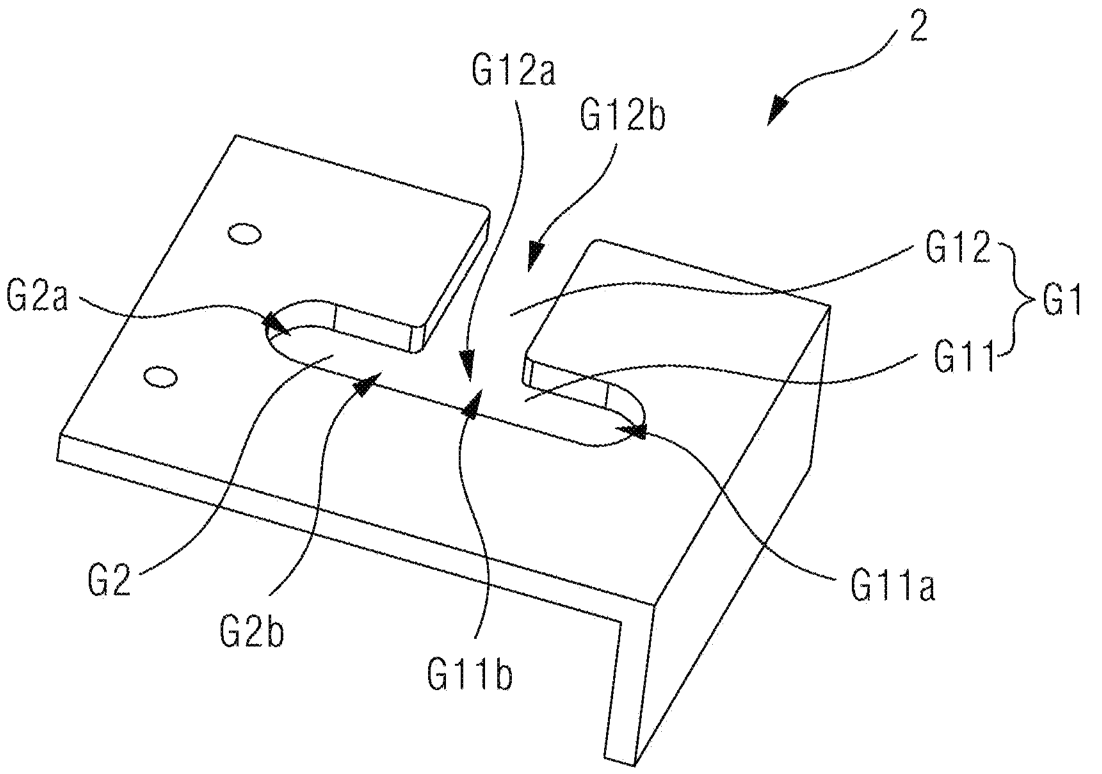
FIG. 4 is a schematic perspective view showing a mounting bracket of a quick installation connector according to a first embodiment of the present disclosure.

In the first embodiment of the present disclosure, as best shown in FIG. 4, a second end G2*b* of the elongated guide channel G2, a second end G11*b* of the first segment G11, and a first end G12*a* of the second segment G12 are in communication with each other. Of course, in the first embodiment of the present disclosure, the elongated guide channel G2 may be provided independently from the through channel G1.

In the first or second embodiment of the present disclosure, the mounting bracket 2 may further comprise a plate-like handle 22, and the plate-like handle 22 is perpendicularly connected to the plate-like component 21 at the other part of the plate-like component 21 located outside the housing 1, to facilitate pulling or pushing the mounting bracket 2 by the user with hands.

In the first embodiment of the present disclosure, as best shown in FIG. 1, the fixed component 3 may comprise a base 31 fixedly provided in the interior space and a connection screw 32 screwed to the base 31 and having a head and a bolt, wherein a first end of the spring 4 is hooked to the bolt and located between the base 31 and the head, in particular clamped between the base 31 and the head.

In the second embodiment of the present disclosure, as best shown in FIG. 5, the fixed component 3 may comprise protruding portions 30 protruding from a side wall of the housing 1 towards the interior space, and the first end of the spring 4 is sheathed outside the protruding portion 30 and abuts against the side wall of the housing 1.

In the first or second embodiment of the present disclosure, the quick installation connector may comprise a plurality of fixed components 3 and a plurality of springs 4 that are equal to each other in quantity, the plurality of springs 4 being arranged parallel to each other.

In the first or second embodiment of the present disclosure, the through hole H has a shape fitting the cross-section shape of the plate-like component 21. Further, the through hole H may have a certain extending length in an extension direction parallel to the extension and compression direction of the spring 4, so that the through hole H may be used as a guide hole of the plate-like component 21 of the mounting bracket 2.

Figure 9:
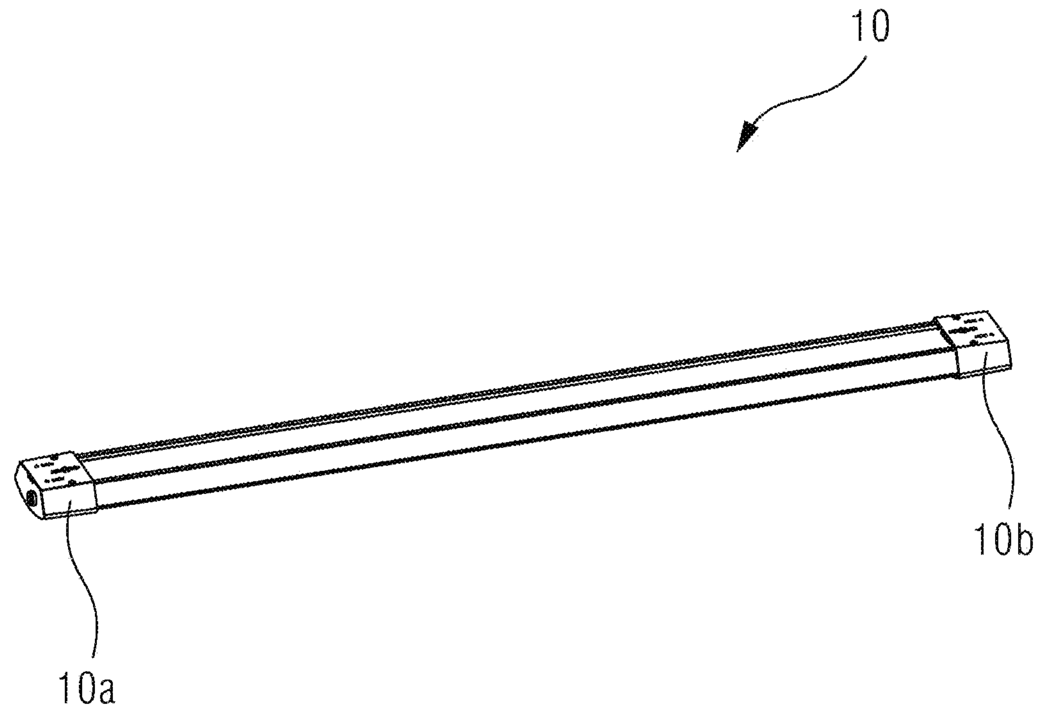
FIG. 9 is a schematic perspective view showing an elongated lamp tube to which the quick installation connector of the present disclosure is intended to be mounted.

In addition, the present disclosure further provides a lamp assembly, the lamp assembly may comprise an elongated lamp tube 10 shown in FIG. 9 and one or two quick installation connectors, wherein the quick installation connectors are fixed to the end portions 10*a* and 10*b* of the elongated lamp tube 10. In the embodiments in which the lamp assembly includes a quick installation connector, the quick installation connector can be fixed to one end portion 10*a* or 10*b* of the elongated lamp tube 10, while the other end portion can be used for mounting of other types of connectors. In the embodiments in which the lamp assembly includes two quick installation connectors, the two quick installation connectors can be fixed to the two end portions 10*a* and 10*b* of the elongated lamp tube 10, respectively, with one quick installation connector being mounted to each end portion.

Of course, the quick installation connector of the present disclosure is not limited to the application of the elongated lamp tube, and can also be applied to other various lamps and lamp products that require a fixed position during mounting, such as a down lamp, a ceiling lamp and a cabinet lamp.

The content above only relates to preferred embodiments of the present disclosure, and is not intended to limit the present disclosure. For a person skilled in the art, the present disclosure may have various modifications and changes. Any modifications, equivalent replacements, improvements and the like made within the principle of the present disclosure shall fall within the scope of protection of the present disclosure.

The invention claimed is:

1. A installation connector, comprising:

a housing, the housing having an interior space, and a through hole being provided on the housing;

a mounting bracket, the mounting bracket comprising a plate-like component, a part of the plate-like component extending into the interior space of the housing through the through hole, and the other part of the plate-like component being located outside the housing;

at least one fixed component, the fixed component being fixed in the interior space of the housing;

at least one spring, a first end of the spring being fixed to a corresponding fixed component, a second end of the spring opposite to the first end being fixed to the part of the plate-like component located in the interior space, and an extension and compression direction of the spring being parallel to the plate-like component, wherein the plate-like component is provided with a through channel penetrating the plate-like component in a direction perpendicular thereto, the through channel has a first segment extending parallel to the extension and compression direction of the spring and a second segment intersecting the first segment, the first segment has a first end for abutting against a fixed screw fixed on a surface to be mounted and a second end opposite to the first end of the first segment, the second segment has a first end for communicating with the second end of the first segment and a second end for penetrating through an edge of the plate-like component to communicate with the outside, wherein the mounting bracket is configured to be able to perform translational movement between a rest position, an alignment position and an assembly position through the through hole along the extension and compression direction of the spring, wherein in the rest position, the spring is in a natural state; in the alignment position, the second segment is aligned with the fixed screw such that the fixed screw can enter the first segment via the second segment; and in the assembly position, the fixed screw abuts against the first end of the first segment.

2. The installation connector according to claim 1, wherein the first end of the first segment is located further away from the spring than the second end of the first segment, wherein in the alignment position and in the assembly position, the spring is in an extended state, wherein the length of the spring in the alignment position is greater than the length of the spring in the assembly position.

3. The installation connector according to claim 2, wherein in the rest position, the through channel is located inside the housing.

4. The installation connector according to claim 2, further comprising a limiting member fixed on the housing and extending into the interior space, the plate-like component is further provided with an elongated guide channel penetrating the plate-like component in a direction perpendicular thereto, an extending direction of the elongated guide channel is parallel to the extension and compression direction of the spring and has a first end and a second end opposite to each other, the first end of the elongated guide channel is located closer to the spring than the second end of the elongated guide channel, the limiting member extends perpendicular to the plate-like component into the elongated guide channel for limiting the translational movement of the mounting bracket, the second end of the elongated guide channel, the second end of the first segment, and the first end of the second segment are in communication with each other.

5. The installation connector according to claim 2, wherein the fixed component comprises a base fixedly provided in the interior space and a connection screw screwed to the base and having a head and a bolt, wherein a first end of the spring is hooked to the bolt and located between the base and the head.

6. The installation connector according to claim 1, wherein the first end of the first segment is located closer to the spring than the second end of the first segment, wherein in the rest position, the through channel is located outside the housing, and in the alignment position and the assembly position, the spring is in a compressed state, wherein the length of the spring in the alignment position is less than the length of the spring in the assembly position.

7. The installation connector according to claim 6, wherein the fixed component comprises protruding portions protruding from a side wall of the housing towards the interior space, and the first end of the spring is sheathed outside the protruding portion and abuts against the side wall of the housing.

8. The installation connector according to claim 1, further comprising a limiting member fixed on the housing and extending into the interior space, the plate-like component is further comprises an elongated guide channel penetrating the plate-like component in a direction perpendicular thereto, an extending direction of the elongated guide channel is parallel to the extension and compression direction of the spring and has a first end and a second end opposite to each other, the first end of the elongated guide channel is located closer to the spring than the second end of the elongated guide channel, the limiting member extends perpendicular to the plate-like component into the elongated guide channel for limiting the translational movement of the mounting bracket.

9. The installation connector according to claim 8, wherein the elongated guide channel and the through channel are provided independently from each other.

10. The installation connector according to claim 1, wherein the mounting bracket further comprises a plate-like handle, and the plate-like handle is perpendicularly connected to the plate-like component at the other part of the plate-like component located outside the housing.

11. The installation connector according to claim 1, wherein the quick installation connector comprises a plurality of fixed components and a plurality of springs that are equal to each other in quantity, the plurality of springs being arranged parallel to each other.

12. The installation connector according to claim 1, wherein the through hole has a shape fitting the cross-section shape of the plate-like component.

13. A lamp assembly comprising:

an elongated lamp tube and one or two installation connectors according to claim 1, wherein the installation connectors are fixed to the end portion of the elongated lamp tube.

* * * * *